E. F. McCARTHY.
SHOCK ABSORBER FOR AUTOMOBILES.
APPLICATION FILED NOV. 25, 1919.

1,391,553. Patented Sept. 20, 1921.

Inventor
Edward F. McCarthy.
By Fisher, Towle, Clapp & Soans attys.

UNITED STATES PATENT OFFICE.

EDWARD F. McCARTHY, OF CHICAGO, ILLINOIS, ASSIGNOR TO THE RAMO MANUFACTURING COMPANY, OF CHICAGO, ILLINOIS, A CORPORATION OF ILLINOIS.

SHOCK-ABSORBER FOR AUTOMOBILES.

1,391,553.  Specification of Letters Patent.  Patented Sept. 20, 1921.

Application filed November 25, 1919. Serial No. 340,678.

*To all whom it may concern:*

Be it known that I, EDWARD F. MCCARTHY, a citizen of the United States, residing at Chicago, in the county of Cook and State of Illinois, have invented certain new and useful Improvements in Shock-Absorbers for Automobiles, of which the following is a specification.

The object of this invention is to provide a shock absorber for an automobile that in no way will interfere with the regular spring mounting of the automobile, and will absorb equally well the downward and rebound thrusts.

A further object is to provide a shock absorber that will keep the front axle and rear axle parallel and rigid in relation to spring mounting.

The many other objects and advantages of the invention will be better understood by reference to the following specification when considered in connection with the accompanying drawings illustrating selective embodiments thereof, in which:—

Figure 1:
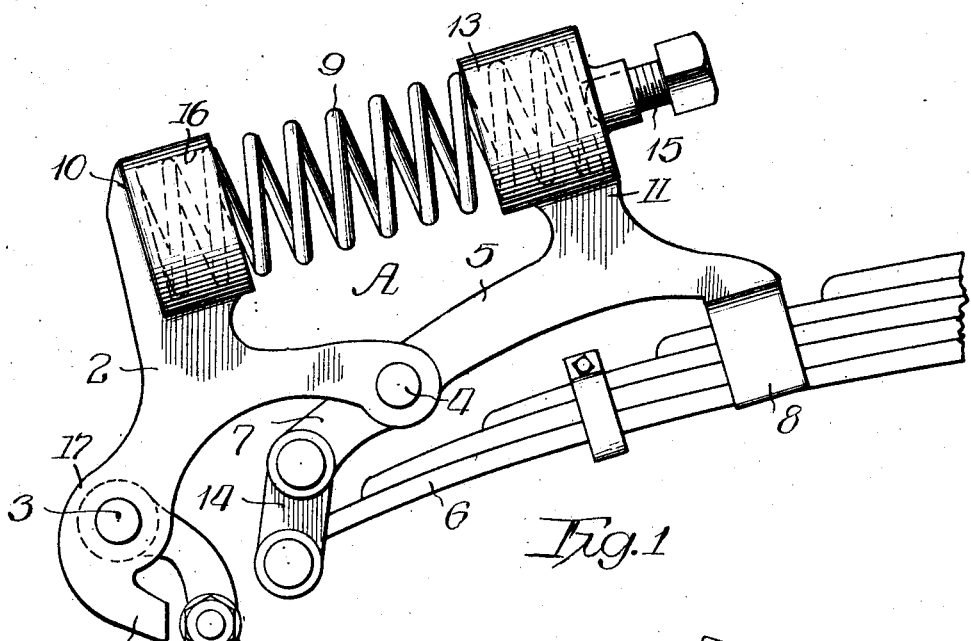
Figure 1 is a side elevation of my invention as applied to the front spring of a vehicle.

Referring to the drawings, the invention is shown to comprise a perch 1 having a lever 2 fulcrumed thereon at 3. This lever 2 is likewise pivotally connected at 4 to the lever 5. The outer extremity of a leaf spring 6 is connected to the extremity 7 of the lever 5 by the shackles 14. The extremity 8 of the lever 5 rests against the leaf spring 6. The lever 5 is provided with an upward projection 11 in which is formed a socket 13 to receive one end of the coil compression spring 9. The lever 2 is likewise provided with an upward projection 10 having a socket 16 formed therein and disposed opposite to the socket 13 in the lever 5 to receive the other extremity of the spring 9. A screw 15 is provided in the socket 13 to compress the spring 9 against the lever 2. No screw is provided in the socket 16. A stop 12 on the outer extremity of the lever 2 is adapted to contact with the perch 1.

Figures 2, 4:
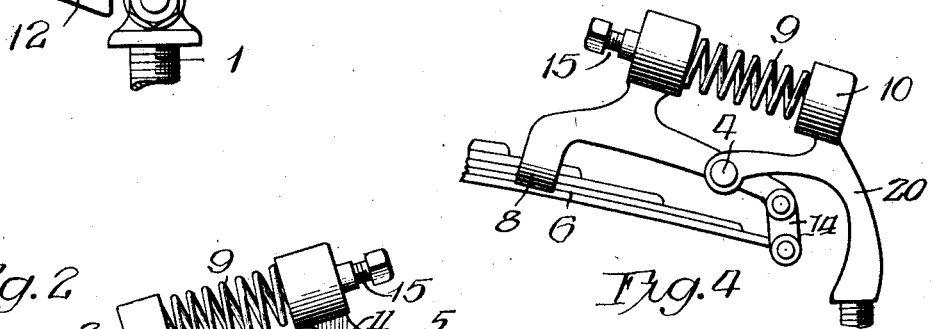
Fig. 2 is a side elevation of my invention as applied to a rear spring.
Figs. 3 and 4 show slightly modified forms of my invention.

When the shock absorber is to be secured to the rear spring, as shown in Fig. 2, the outer portion 17 of the lever 2, as shown in Fig. 1, may be omitted, and this lever 2 connected to the rear axle by means of an arm 19 having its lower extremity connected to the frame and its upper extremity pivotally connected to the lever 2.

Figure 3:
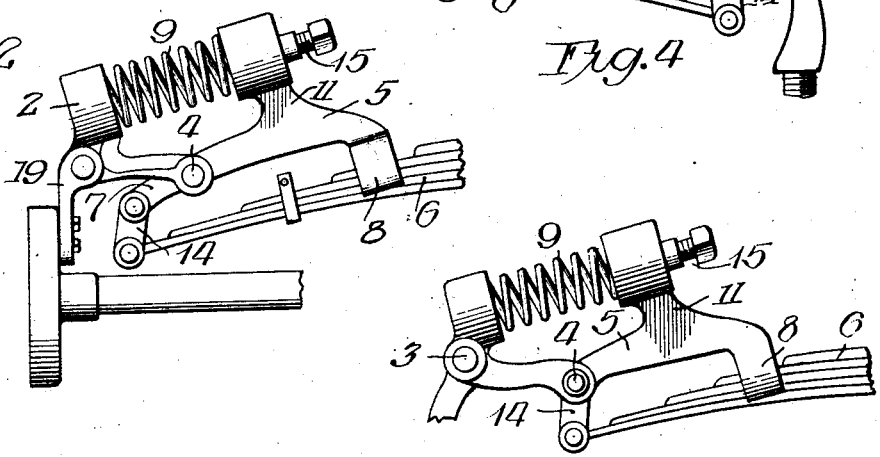

In the modification of the invention shown in Fig. 3 of the drawings, the shackles 14 are attached to the pivot pin 4 connecting the levers 2 and 5.

In the modification of the invention shown in Fig. 4, the perch 1 and the lever 2 of the embodiment shown in Fig. 1 have been combined into a single member 20.

The weight of the vehicle is carried by shackles 14 so it is apparent that any thrusts or shocks that are to be dissipated, will start from this point. A downward thrust at point 7 tends to collapse the levers 2 and 5, due to the down pull at fulcrum 4, and to compress the spring 9. An upward thrust or rebound is arrested by the extremity 8 of lever 5 and is checked by lever 2 coming in contact with perch 1, which causes the spring 9 to be compressed between the projections 10 and 11 or levers 2 and 5, thereby causing the thrust to be dissipated by spring 9.

It will be readily appreciated from the foregoing description that the present invention is exceedingly simple in construction, efficient in action, and easy to attach. I am aware that a considerable number of changes in the construction and arrangement of parts and in the method of attachment of the same to the vehicle may be made without departing from the spirit of my invention, and I reserve the right to make all such as fairly fall within the scope of the following claims:

I claim:

1. In a vehicle, the combination with a body member and a frame member, of means for resiliently supporting said body member on said frame member comprising a leaf spring secured to one of said members, a lever connected to the other of said members, a second lever connected to the first lever and linked to the end of said spring so that a downward thrust causes one of said levers to approach the other, and a spring interposed between said levers to oppose the approach of said levers.

2. In a vehicle, the combination with a body and a main frame, of means for resiliently supporting said frame comprising a leaf spring secured to said body, a lever fulcrumed on said frame, a second lever connected to the first lever and linked to the end of said spring so that a downward thrust of said body causes said levers to collapse, and a coil compression spring interposed between opposing projections on said levers to oppose the collapse of said levers.

3. In a vehicle, the combination with a body and a main frame, of means for resiliently supporting said body on said frame comprising a leaf spring secured to said body, a lever fulcrumed on said frame, a second lever fulcrumed on the first lever and linked to the end of said spring so that a downward thrust at the point where the levers are fulcrumed causes said levers to collapse, oppositely disposed sockets formed on said levers, and a coil compression spring having its ends seated in said sockets to oppose the collapse of said levers.

4. In a vehicle, the combination with a body member and a frame member, of means for resiliently supporting said body member on said frame member comprising a leaf spring secured to one of said members, a lever fulcrumed on the other member, a second lever connected to the first lever and linked to the end of said spring, a coil spring interposed between said levers, and means whereby an upward or a downward thrust of said leaf spring shall cause said levers to collapse and said coil spring to be compressed and to dissipate the thrust.

5. In a vehicle, the combination with a body member and a frame member, of means for resiliently supporting said body member on said frame member comprising a leaf spring secured to one of said members, a lever connected to said spring, and a second lever pivotally mounted on the other of said members and having a single connection with the first lever at an interval from the point of connection of said first lever and said spring, so that a downward thrust causes said levers to collapse, and a spring interposed between said levers to oppose the collapse of said levers.

EDWARD F. McCARTHY.